United States Patent
Ji et al.

(10) Patent No.: US 8,032,690 B2
(45) Date of Patent: Oct. 4, 2011

(54) NON-VOLATILE MEMORY DEVICE, AND METHOD OF ACCESSING A NON-VOLATILE MEMORY DEVICE

(75) Inventors: Yung-Li Ji, Hsinchu (TW); Shih Chieh Tai, Hsinchu (TW); Chih Nan Yen, Hsinchu (TW); Fu-Ja Shone, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 790 days.

(21) Appl. No.: 12/024,149

(22) Filed: Feb. 1, 2008

(65) Prior Publication Data
US 2009/0198919 A1 Aug. 6, 2009

(51) Int. Cl.
G06F 12/00 (2006.01)
G06F 13/00 (2006.01)

(52) U.S. Cl. . 711/103; 711/154; 711/167; 711/E12.008; 710/22; 713/320

(58) Field of Classification Search ........................ None
See application file for complete search history.

(56) References Cited

U.S. PATENT DOCUMENTS

| | | | | |
|---|---|---|---|---|
| 5,603,066 A * | 2/1997 | Krakirian | ...................... | 711/112 |
| 6,684,288 B1 * | 1/2004 | Jacobs | .......................... | 711/103 |
| 7,393,247 B1 * | 7/2008 | Yu et al. | ........................ | 439/638 |
| 2002/0184432 A1 * | 12/2002 | Ban | ................ | 711/102 |
| 2005/0027894 A1 | 2/2005 | Ayyavu et al. | | |
| 2005/0144490 A1 | 6/2005 | Igari | | |
| 2005/0235171 A1 | 10/2005 | Igari | | |
| 2006/0069930 A1 | 3/2006 | Dixon et al. | | |
| 2006/0129703 A1 * | 6/2006 | Oshikawa et al. | .............. | 710/14 |
| 2006/0218437 A1 * | 9/2006 | Kawa et al. | ....................... | 714/6 |
| 2007/0061506 A1 * | 3/2007 | Liang et al. | ................... | 711/103 |

OTHER PUBLICATIONS

Hitachi Travelstar 7K100, 2.5-Inch Hard Disk Drives, www.hitachigst.com, 2 pgs, 2005.
Hitachi Travelstar 5K120, 2.5-Inch Hard Disk Drives, www.hitachigst.com, 2 pgs, 2006.
Intel Technology Journal, vol. 9, Issue 1, 2005, 106 pgs.

* cited by examiner

*Primary Examiner* — Michael Krofcheck
(74) *Attorney, Agent, or Firm* — Grossman, Tucker, Perreault & Pfleger, PLLC (57) ABSTRACT

A non-volatile memory device, and a method for accessing the non-volatile memory device are provided. The non-volatile memory device is connected to a host via a bus. The non-volatile memory device comprises an MCU. By independently processing the particular commands using only the auxiliary circuit, the MCU can cease to operate, thus saving power. By setting the bus into power saving mode when the non-volatile memory device is busy, the host and the non-volatile memory device would not communicate mutually, thus, saving power.

13 Claims, 7 Drawing Sheets

NON-VOLATILE MEMORY DEVICE, AND METHOD OF ACCESSING A NON-VOLATILE MEMORY DEVICE

CROSS-REFERENCES TO RELATED APPLICATIONS

Not applicable.

BACKGROUND OF THE INVENTION

1. Field of the Invention

The present invention relates to a non-volatile memory device. More particularly, the present invention relates to a non-volatile memory with an auxiliary circuit that independently processes commands along with a microprocessor control unit.

2. Descriptions of the Related Art

A hard disc is an essential device for a computer, which stores various kinds of data, such as programs, document files, music files, and etc. Conventionally, hard discs that meet the parallel ATA standard are widely used in the computer industry. However, with the improvement of fast transmissions, a new standard has been developed: the serial ATA standard. Although the serial ATA standard has fast transmission, using the serial ATA standard consumes more power than using the conventional parallel ATA standard. As a result, if the serial ATA standard is used, the bus of this hard disc has to operate at a much faster oscillation frequency. Generally, the oscillation frequency is much faster than the oscillation frequency of a conventional hard disc, for example, the bus of a hard disc meeting the SATA standard operates at an oscillation frequency of 3,000 MHz or 1,500 MHZ, and the bus of a conventional hard disc normally operates at an oscillation frequency lower than 133 MHz. That result is greater power consumption.

Some rules of the serial ATA standard allow the bus of this hard disc to get into the rest modes of different levels. For example, the serial ATA standard defines a partial status where the hard disc could wait 10 µs before processing the next operation. Meanwhile, a hard disc getting into the slumber status could wait no longer than 10 ms to process a next operation.

For the current design of non-volatile memory, the non-volatile memory can't transfer data in certain situations, which are denoted as an erasing waiting time, a reading waiting time and a writing waiting time in below. The erasing waiting time, reading waiting time, and writing waiting time are operation time of the non-volatile memory. For the writing waiting time, a typical current flash write procedure comprises the steps of: (A1) sending command/address to the flash memory; (B1) waiting a short time; (C1) transferring data to the flash memory in high speed; (D1) waiting 300 us~800 us; and (E1) reading a status of the flash memory and completing this writing. The steps A1, B1, D1, or E1 could be parts the writing waiting time.

For the reading waiting time, a typical current flash read procedure comprises steps of: (A2) sending command/address to the flash memory; (B2) waiting a short time: (C2) transferring data from the flash memory in high speed; (D2) reading a status of the flash memory and completing this reading. The steps A2, B2 or D2 could be the reading waiting time.

For the erasing waiting time, a typical current flash erase procedure, it's the time the flash memory can't transfer data during the erase process. Therefore, all steps of erasing could be the erasing waiting time.

Meanwhile, all the operations of the hard disc are controlled by the microprocessor control unit (MCU). For some particular operations, using the MCU may increase the power consumption as well.

Thus, it is important to develop a new hardware and software structure for a hard disc that can save power.

SUMMARY OF THE INVENTION

The primary objective of this invention is to provide an auxiliary circuit for controlling the accessing modes of a non-volatile memory device. The non-volatile memory device comprises an MCU. By independently processing the particular commands with only the auxiliary circuit, the MCU does not need to be used, thus, saving power.

Another objective of this invention is to provide a non-volatile memory device connected to a host via a bus. By putting the bus into power saving mode when the non-volatile memory device is erasing or waiting, the host and the non-volatile memory device would not communicate mutually, thus, saving power.

Another objective of this invention is to provide a non-volatile memory device comprising an auxiliary circuit for controlling the accessing modes of the non-volatile memory device. The non-volatile memory device comprises an MCU. By independently processing the particular commands with only the auxiliary circuit, the MCU does not need to be operated, thus saving power.

Another objective of this invention is to provide a method for accessing a non-volatile memory device connected to a host via a bus, the non-volatile memory device comprising a non-volatile memory and a microprocessor controlling unit (MCU). The method comprises the following steps: judging an accessing command from the host; executing a pre-determined accessing mode in response to the accessing command to read or write the non-volatile memory device; pausing operation of the non-volatile memory device when the non-volatile memory is busy; and resuming operation of the non-volatile memory device after the busy time in response to the accessing command.

Yet a further objective of this invention is to provide a method of accessing a non-volatile memory device connected to a host via a bus. The method comprises the steps of: judging a wear-leveling command from the non-volatile memory device; setting the bus into power saving mode when the non-volatile memory device is in wear-leveling; and resuming operation of the bus after the wear-leveling.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the descriptions that follow, the present invention will be described in reference to the embodiments that describe a software procedure or auxiliary circuit for controlling the accessing modes of a non-volatile memory device and thus saving power. However, embodiments of the invention are not limited to any particular environment, application or implementation. Therefore, the descriptions of the embodiments that follow are for purposes of illustration and not limitation. It is understood that elements indirectly related to the present invention are omitted and are not shown in the following embodiments and drawings. The terms in capital letters in the following paragraphs are defined in the Serial Advanced Technology Attachment (SATA) standard. People skilled in the art can understand the meaning of the terms and redundant descriptions are omitted hereinafter.

Figure 1:
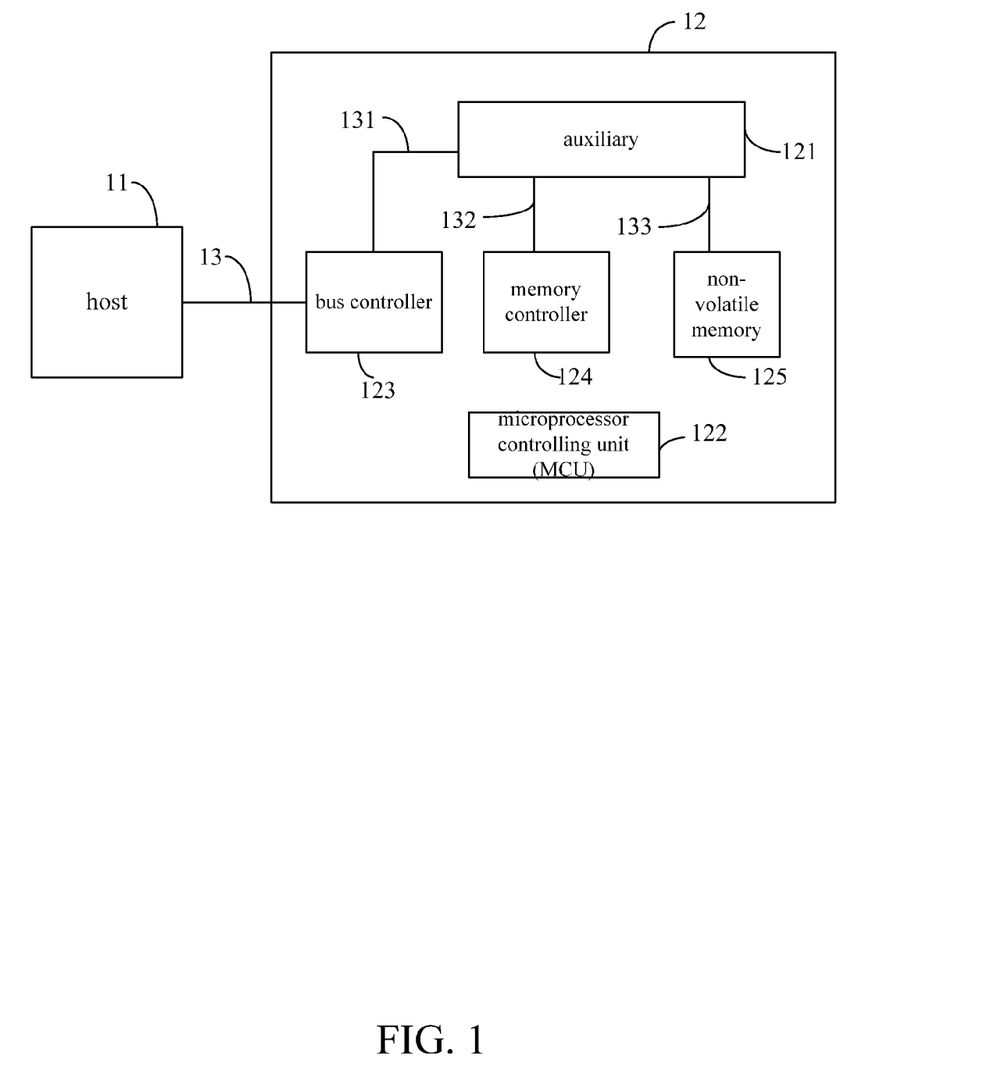
FIG. 1 is a connection diagram of a host and a non-volatile memory device.

FIG. 1 illustrates the connection diagram of a host 11 and the non-volatile memory device 12 connected to the host 11 via a bus 13. The non-volatile memory device 12 comprises an auxiliary circuit 121 of the present invention, a microprocessor controlling unit (MCU) 122, an bus controller 123, a memory controller 124, and a memory 125. The non-volatile memory 125 of the embodiment is a flash memory. The auxiliary circuit 121 comprises a first terminal 131, a second terminal 132, and a third terminal 133, in which the first terminal is coupled to the bus controller 123, the second terminal is couple to the memory controller 124, and the third terminal is coupled to the non-volatile memory 125. The bus controller 123 meets the SATA standard and is configured to communicate with the host 11 via the bus 13.

The flash memory is characterized in that when a block thereof contained data and the block is assigned to be written with new data, the block has to erase the previous data first. The flash memory cannot accept further command or operation, until the erasing operation is done, that is, the flash memory is in a busy time and can't transfer data. The busy time relates to one of an erasing waiting time, a writing waiting time, a reading waiting time, and a combination thereof of the non-volatile memory 125. For example, the busy time may be calculated by summing up at least one operation time of the non-volatile memory 125 of the non-volatile memory device 12, in which the operation time is selected from groups of the erasing waiting time, the reading waiting time, and the writing waiting time of the non-volatile memory 125 of the non-volatile memory device 12.

Thus, the non-volatile memory device 12 is configured to put the bus 13 into a power saving mode, for example pausing oscillation of the bus 13. That is, the bus controller 123 pauses the bus 13 when the memory controller 124 erases the non-volatile memory 125, and the bus controller 123 resumes the bus 13 after the memory controller 124 has erased the non-volatile memory 125. More particularly, an example is given as follows. When the non-volatile memory device 12 receives a write command from the host 11 to write ten blocks stored data, the non-volatile memory device 12 then calculates an erasing time needed to erase the ten blocks. Considering an individual erasing time for one block is 10 ms, the erasing time for ten blocks is easily to be calculated as 100 ms. That is, the memory controller 124 predicts the busy time by summing the busy time of each block that needs to be accessed. The non-volatile memory device 12 then sends a resting signal to the host 11 and then put the bus 13 between the non-volatile memory device 12 and the host 11 into a reduced power state, i.e. power saving mode, until the erasing operation is going to be finished. The bus controller 123 is designed to resume the bus 13 after the busy time. That is, the bus controller 123 may resume the bus 13 right after the busy time, or the bus controller 123 may resume the bus 13 before the end of the busy time to make the bus 13 operate substantially right after the busy time. For the latter situation, the bus 13 is able to operate again without lag after the busy time.

If the resting signal represents a slumber status defined in the SATA standard, which takes 10 ms duration to process a next operation, the host 11 and the bus 13 would be resumed after 90 ms of the erasing time, and then the next 10 ms can both erase rest block and accomplish the resuming of the bus. The resting signal and resuming signal may be generated by the auxiliary circuit 121, the bus controller 123 or the MCU 122 according to different system designs. Moreover, the bus controller 123 further sets the bus 13 into power saving mode when the non-volatile memory 125 is executing wear-leveling algorithm, and the bus controller 123 resumes the bus 13 after the wear-leveling. That is, the non-volatile memory 125 cannot be accessed during the executing of wear-leveling, and setting the bus 13 into power saving mode is able to save power consumption. The busy time of each block of the non-volatile memory 125 may be stored in a table in advance, then the memory controller 124 predicts the busy time by looking up the table.

The auxiliary circuit 121 is configured to execute some particular sequence of operations and to control accessing modes of the non-volatile memory device 12. When the auxiliary circuit 121 operates, the MCU 122 ceases to operate. By using the auxiliary circuit 121, the non-volatile memory device 12 can save power. The detailed descriptions of the auxiliary circuit 121 are explained hereinafter. For some embodiments, there may be buffers set in between two modules that are connected to each other. The buffers are configured to buffer the data transmission.

Figure 2:
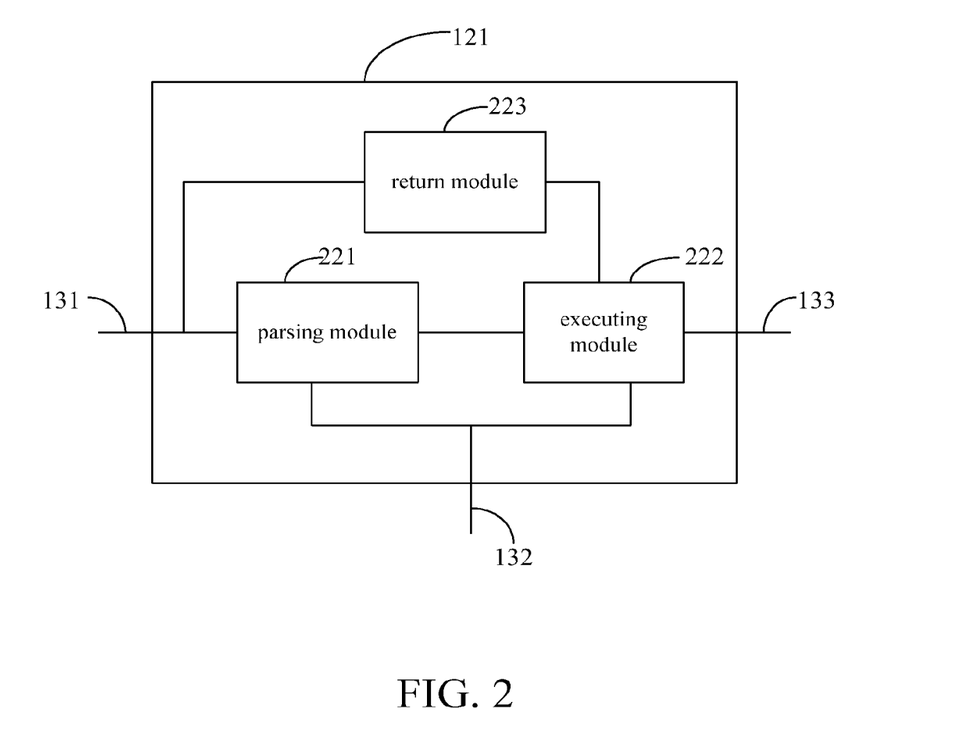
FIG. 2 is an embodiment of the auxiliary circuit.

FIG. 2 illustrates an embodiment of the auxiliary circuit 121. The auxiliary circuit 121 comprises a parsing module 221, an executing module 222, and a return module 223. The parsing module 221 is coupled to both the first terminal 131 and second terminal 132 and is configured to receive and compile an accessing command from the bus controller 123, and generate a parsing signal in response to the accessing command. The executing module 222 is coupled with the parsing module 221, the second terminal 132, and the third terminal 133, and is configured to execute the pre-determined accessing mode to read or write the non-volatile memory 125 in response to the parsing signal. The executing module 222 is further configured to execute the pre-determined accessing mode in response to a wear-leveling command of the memory controller 124 to read or write the non-volatile memory 125. The wear-leveling command is adapted to unify average erasing times of the non-volatile memory 125, people skilled in the art of flash memory industry can understand many methods of wear-leveling, thus redundant description is omitted hereinafter. The return module 223 is coupled with the executing module 222 and the first terminal 131, in which the return module 223 is configured to generate a return signal in response to the result of the executing module 222. Particularly, the pre-determined accessing mode can only be executed by the auxiliary circuit 121, but not executed by the MCU 122.

In a particular embodiment, the auxiliary circuit 121 is configured to generate the resting signal in response to the parsing signal before writing the non-volatile memory 125, and cease operation of the bus 13 between the host 11 and the non-volatile memory device 12 according to the resting signal. As aforementioned, if the erasing time is 100 ms, and the resting signal represents a slumber status defined in the SATA standard, which takes 10 ms duration to process a next operation, the host 11 and the bus 13 would be ceased when the erasing operation processes. After 90 ms of the erasing operation, the auxiliary circuit is configured to generate an awaking signal in response to the parsing signal, and resume operation of the bus 13 between the host 11 and the non-volatile memory device 12 according to the awaking signal.

As aforementioned, the resting signal may be related to an erasing waiting time, a reading waiting time, and a writing waiting time of the non-volatile memory 125 of the non-volatile memory device 12. In the embodiment, the non-volatile memory 125 is a flash memory, and the resting signal may be related to an erasing waiting time, a reading waiting time, and a writing waiting time of each block of the non-volatile memory 125. More particularly, a typical write procedure of the non-volatile memory device 12 is as follows: first, the host 11 send command/address to the non-volatile memory device 12; second, the non-volatile memory device 12 waits a very short time; third, the host 11 sends data to the non-volatile memory device 12 in high speed; finally; the host 11 waits 300 µs~800 µs then reads status of the non-volatile memory 125. And the resting signal is adapted to pause operation of the bus 13 when the host 11 waits after sending data to non-volatile memory 125.

Figure 3:
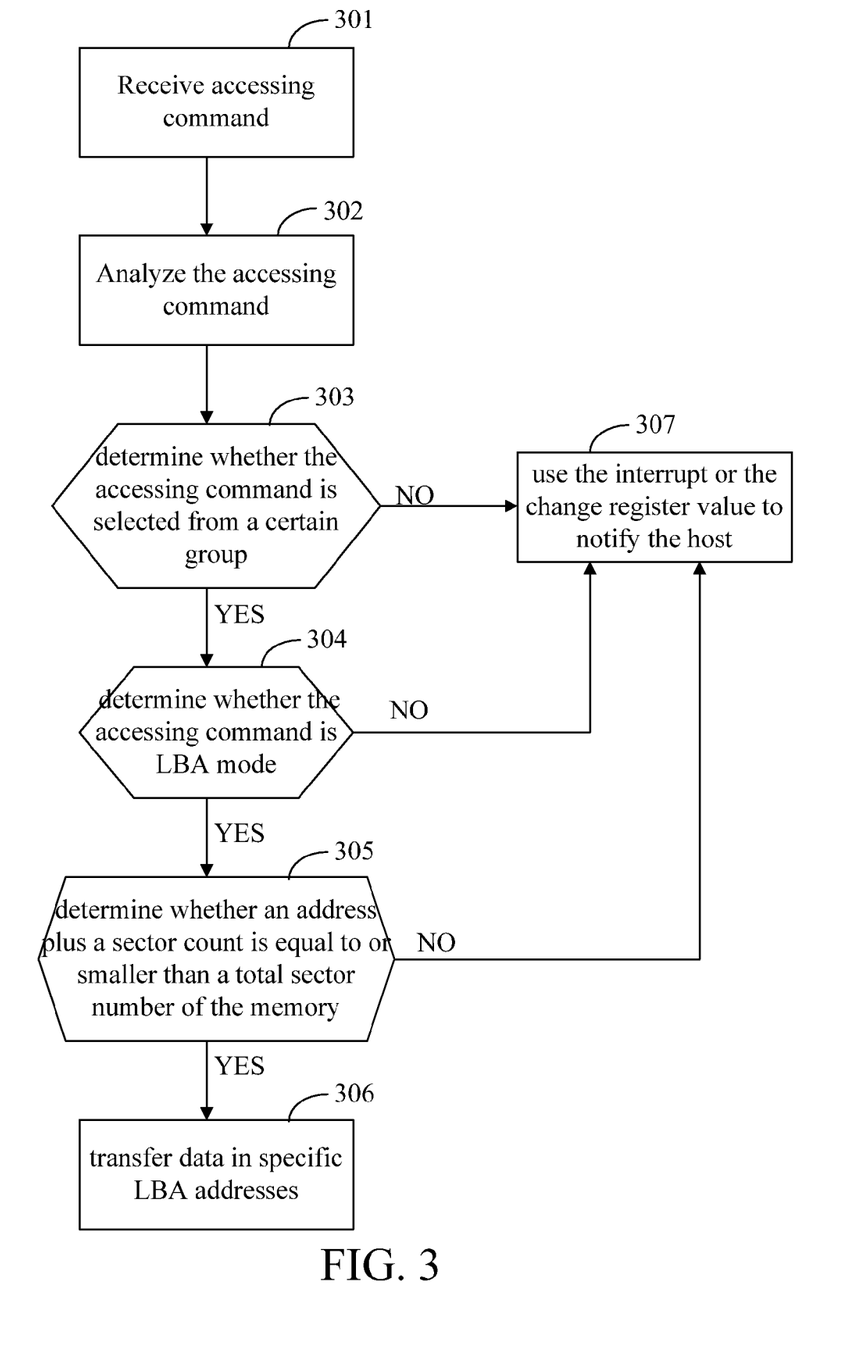
FIG. 3 is a flow chart of the parsing module operation.

FIG. 3 illustrates a flow chart of the operation of the parsing module 221. In step 301, an accessing command is received. In this embodiment, the accessing command is a register-host to device frame information structure (FIS). In step 302, the accessing command is analyzed. In step 303, the parsing module 221 determines whether the accessing command is selected from the following group: a read DMA command, a read DMA EXT command, a write DMA command, a write DMA EXT command, a read MULTIPLE command, a read MULTIPLE EXT command, a WRITE MULTIPLE command, a WRITE MULTIPLE EXT command, a read SECTORS command, a read SECTORS EXT command, a WRITE SECTORS command, a WRITE SECTORS EXT command, a read FPDMA QUEUE command, a read FPDMA QUEUE EXT command, or a combination thereof.

If the accessing command is selected in step 303, then step 304 is executed to determine whether the accessing command is in the Logical Block Addressing, LBA mode. If the accessing command is determined to be in the LBA mode in step 304, then step 305 is executed to determine whether the address and the sector count is equal to or smaller than the total sector number of the non-volatile memory 125. If the address and the sector count is equal to or smaller than the total sector number of the non-volatile memory 125 in step 305, then step 306 is executed to transfer the data in the specific LBA addresses, and notify the executing module 222.

If the accessing command is not selected from step 303, then step 307 is executed to interrupt local MCU or send a change register value to notify the host 11 via the bus controller 123. Similarly, if the accessing command is determined to not be in the LBA mode in step 304, then step 307 is executed to interrupt local MCU or send the change register value to notify the host 11 via the bus controller 123. Similarly, if the address and the sector count are greater than the total sector number of the non-volatile memory 125 in step 305, then step 307 is executed to interrupt local MCU or send the change register value to notify the host 11 via the bus controller 123.

It is understood that the sequence of steps of the flow chart is not limited to the present invention. For example, step 305 may be executed before step 304 is executed.

Figure 4:
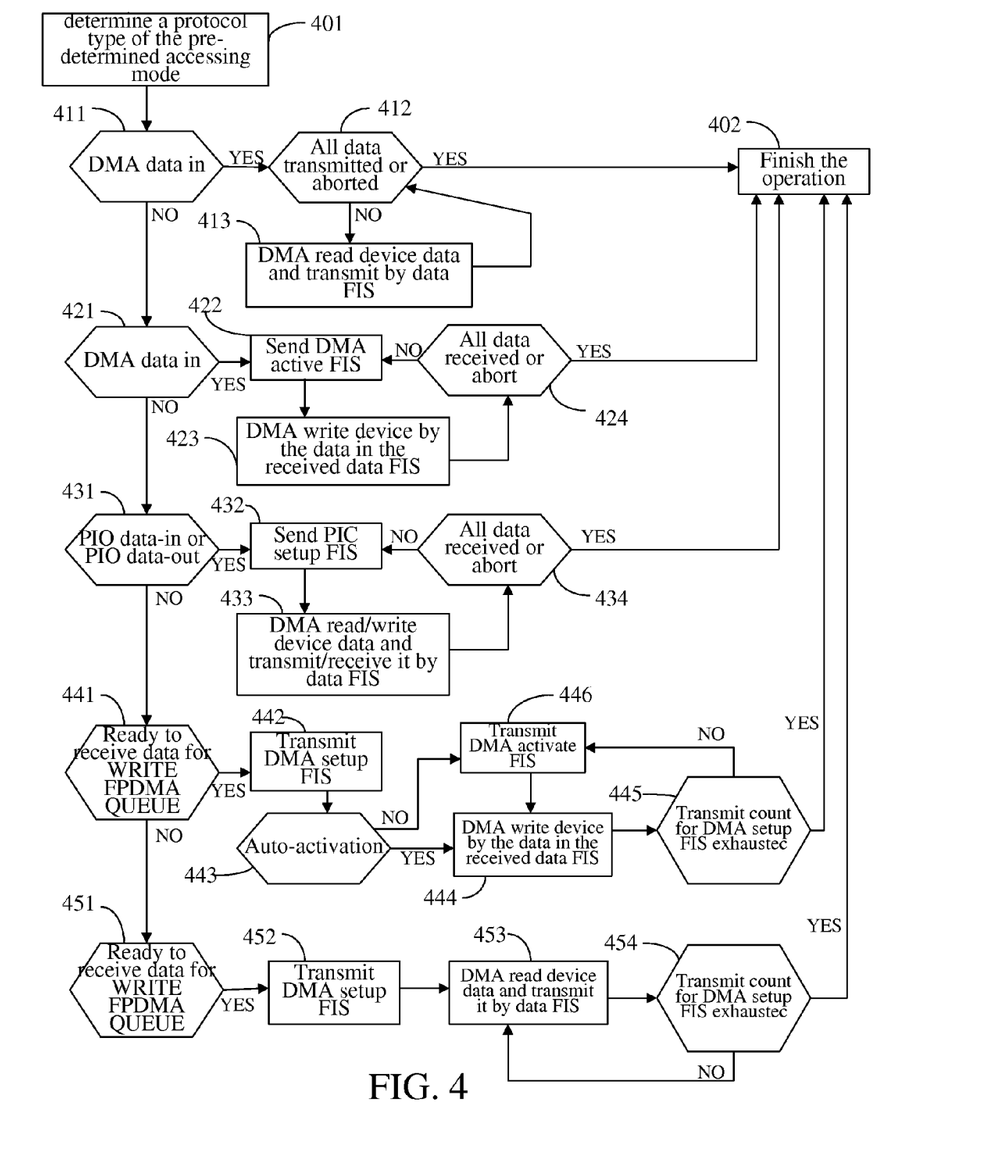
FIG. 4 is a flow chart of the executing module operation.

FIG. 4 illustrates a flow chart of the operation of the executing module 222. In step 401, the executing module 222 is executed to determine the protocol type of the pre-determined accessing mode. The pre-determined accessing mode is selected from the following: a DMA data in mode, a DMA data out mode, a PIO data in mode, a PIO data out mode, a FPDMA queue mode, a read DMA queue mode, a write DMA queue, or a combination thereof. Then the executing module 222 processes the data by the pre-determined accessing mode relative to the data. The parsing signal transmitted from the parsing module 221 indicates information of how the executing module 222 can process the data, such as reading the data from the non-volatile memory, writing the data into the non-volatile memory, the total amount of memory, the start and end address of the data, etc.

Step 411 is executed to determine whether the DMA data is about to be executed. Then step 412 is executed to check whether all the data are transmitted or aborted. If there are still residual data in need of transmission, then step 413 is executed to access the DMA read to read the residual data and transmit the residual data by the accessing command, i.e. the register-host to device FIS in the embodiment. If there are no residual data or if the operation is aborted, then step 402 is executed to finish the operation.

Step 421 is executed to determine whether the DMA data out mode is about to be executed. Then, step 422 is executed to send a DMA active FIS. Then, step 423 is executed to access the DMA write to write the data in the received data FIS. Step 424 is executed to check whether all data have been received or aborted. If there are no residual data, or if the operation is aborted, then step 402 is executed to finish the operation. If there are still residual data, then step 422 is executed again.

Step 431 is executed to determine whether a PIO data-in or a PIO data-out mode is about to be executed. Then, step 432 is executed to send a PIC setup FIS. Step 433 is executed to access the DMA read/write to read/write device data and transmit/receive the device data by data FIS. Finally, step 434 is executed to check whether all data have been received or aborted. If there are no residual data, or if the operation is aborted, then step 402 is executed to finish the operation. If there are still residual data, then step 432 is executed again.

Step 441 is executed to determine whether the non-volatile memory device is ready to receive data for the WRITE FPDMA QUEUE command. Then, step 442 is executed to transmit the DMA setup FIS. Step 443 is executed to check whether auto-activation occurs. If auto-activation occurs, then step 444 is executed to access a DMA write to write device by the data in the received data FIS. Then step 445 is executed to transmit the count for DMA setup FIS exhaustec. If the count does not meet the DMA setup FIS exhaustec, then step 446 is executed to transmit a DMA activate FIS. Also in step 443, if the auto-activation does not occur, then step 446 is executed to transmit a DMA activate FIS. If the count does meet the DMA setup FIS exhaustec, then step 402 is executed to finish the operation.

Step 451 is executed to determine whether the non-volatile memory device is ready to transmit data for the READ FPDMA QUEUE command. Then, step 452 is executed to transmit the DMA setup FIS. Step 453 is executed to access the DMA read to read the device data and transmit it by data FIS. Then, step 454 is executed to transmit the count for the DMA setup FIS exhaustec. If the count does not meet the DMA setup FIS exhaustec, then step 453 is executed again. If the count does meet the DMA setup FIS exhaustec, then step 402 is executed to finish the operation.

Figure 5A:
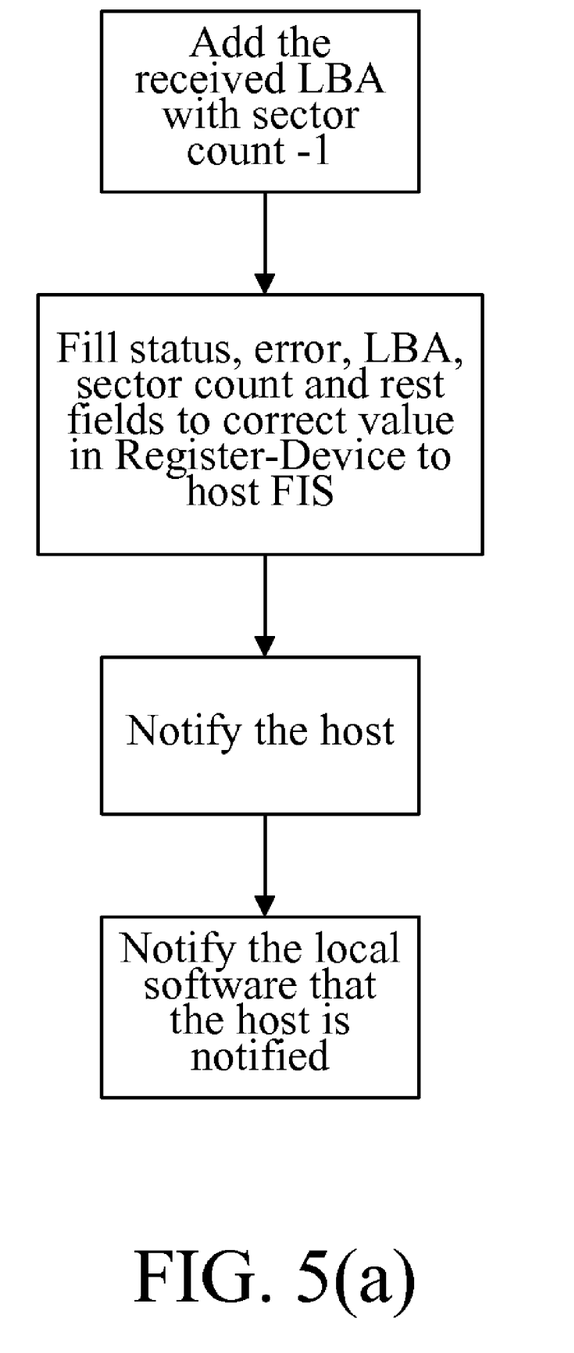
FIGS. 5(a) to 5(c) are different flow charts of the return module operation.
Figure 5B:
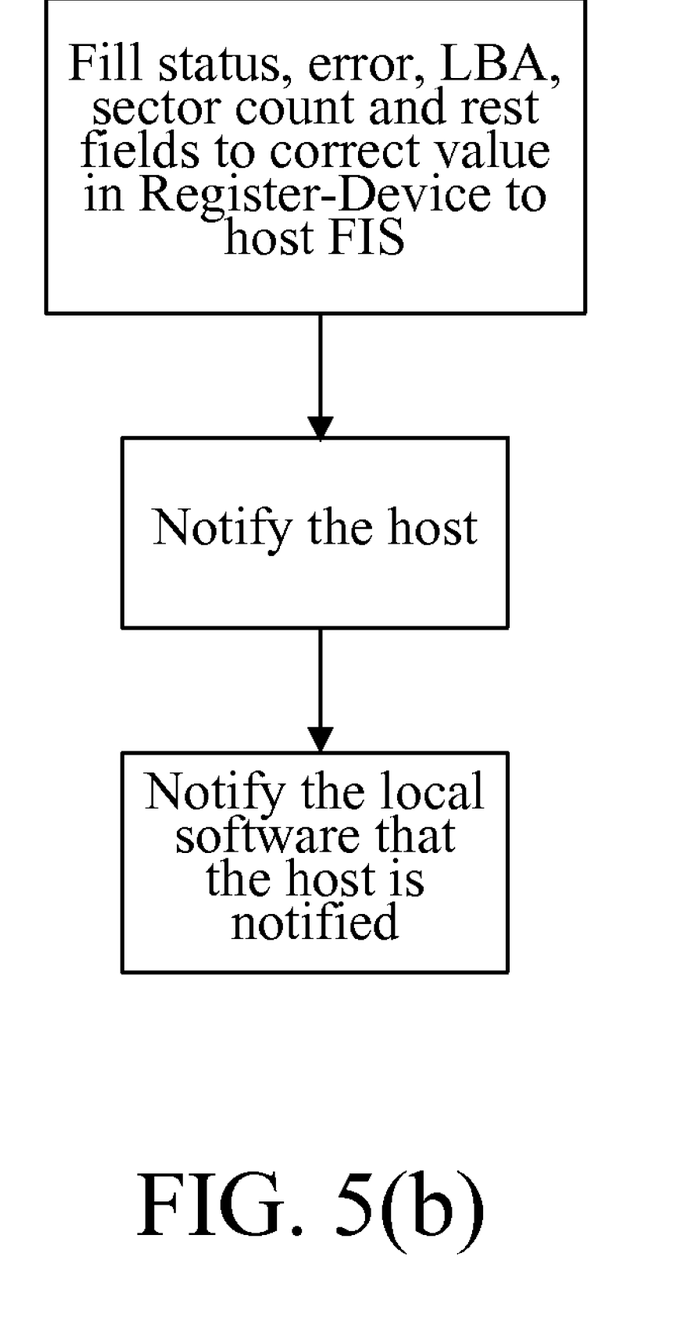
Figure 5C:
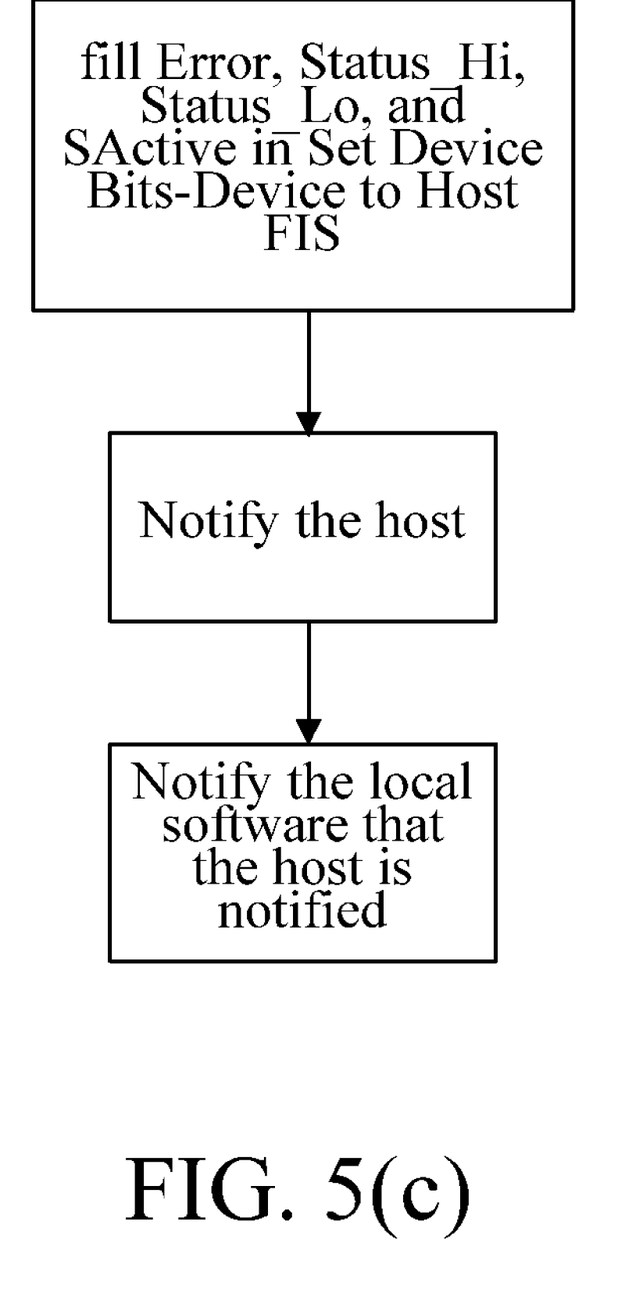

FIGS. 5(*a*) to 5(*c*) illustrate three flow charts of the operation of the return module 223. The return module 223 is configured to generate the return signal in response to the executing result of the executing module 222. FIGS. 5(*a*) to 5(*c*) illustrate the three different kinds of execution results that the return module 223 would operate corresponding to the different executing results. The return signal is then transmitted to the host 11 as a reference for further operation.

FIG. 5(a) illustrates the execution of step 501 to add the received LBA with a sector count minus one. Then, step 502 is executed to fill the status, error, sector count, and rest fields to correct the value in the Register-Device to host FIS. Then, step 503 is executed to notify the host. Then, step 504 is executed to notify the local software that the host is notified.

FIG. 5(b) illustrates step 511 in which the status, error, sector count, and rest fields are filled to correct the value in the Register-Device to host the FIS. Then, step 512 is executed to notify the host. Then, step 513 is executed to notify the local software that the host is notified.

FIG. 5(c) illustrates step 521 in which the error, Status_Hi, Status_Lo, and SActive in Set Device Bits-Device are filled to Host FIS. Then, step 522 is executed to notify the host. Then, step 523 is executed to notify the local software that the host is notified.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A non-volatile memory device connected to a host via a bus, the non-volatile memory device comprising:
    a bus controller, being configured to communicate with the host via the bus;
    a non-volatile memory;
    a memory controller, being configured to access the non-volatile memory, and to predict a busy time in which the non-volatile memory can't transfer data; and
    an auxiliary circuit, for controlling accessing modes of the non-volatile memory device, the auxiliary circuit comprising:
        a first terminal coupled to the bus controller,
        a second terminal coupled to the memory controller;
        a third terminal coupled to the non-volatile memory;
        a parsing module coupled to the first terminal and the second terminal, being configured to receive and compile an accessing command from the bus controller, and generate a parsing signal in response to the accessing command;
        an executing module coupled to the parsing module, the second terminal, and the third terminal, being configured to execute a pre-determined accessing mode to read or write the non-volatile memory in response to the parsing signal, wherein the bus controller sets the bus into power saving mode when the non-volatile memory can't transmit data with bus controller during the busy time, the bus controller resumes the bus according to the busy time, and the pre-determined accessing mode can only be executed by the auxiliary circuit.

2. The non-volatile memory device as claimed in claim 1, wherein the bus controller sets the bus into power saving mode during one of an erasing waiting time, a writing waiting time, a reading waiting time, and a combination thereof of the non-volatile memory.

3. The non-volatile memory device as claimed in claim 1, wherein the bus meets a standard of Serial Advanced Technology Attachment, SATA.

4. The non-volatile memory device as claimed in claim 1, wherein the non-volatile memory is a flash memory comprising a plurality of blocks for storing data, the memory controller predicts the busy time by summing the busy time of each block that needs to be accessed.

5. The non-volatile memory device as claimed in claim 1, wherein the non-volatile memory is a flash memory comprising a plurality of blocks for storing data and a table containing busy time of each block, the memory controller predicts the busy time by looking up the table.

6. The non-volatile memory device as claimed in claim 1, wherein the non-volatile memory is a flash memory comprising a plurality of blocks for storing data, the bus controller sets the bus into power saving mode during the busy time, and the bus controller resumes the bus before the end of the busy time to make the bus operate substantially right after the busy time.

7. The non-volatile memory device as claimed in claim 1, wherein an interface controller further sets the bus into power saving mode during wear-leveling of the non-volatile memory, and the bus controller resumes the bus after the wear-leveling.

8. An auxiliary circuit for controlling accessing modes of a non-volatile memory device, the non-volatile memory device comprising the auxiliary circuit, a bus controller, a memory controller and a non-volatile memory, the auxiliary circuit comprising:
    a first terminal coupled to the bus controller;
    a second terminal coupled to the memory controller;
    a third terminal coupled to the non-volatile memory;
    a parsing module coupled to the first terminal and the second terminal, being configured to receive and compile an accessing command from the bus controller, and generate a parsing signal in response to the accessing command; and
    an executing module coupled to the parsing module, the second terminal, and the third terminal, being configured to execute a pre-determined accessing mode to read or write the non-volatile memory in response to the parsing signal, wherein the pre-determined accessing mode can only be executed by the auxiliary circuit.

9. The auxiliary circuit as claimed in claim 8, further comprising a return module coupled to the executing module and the first terminal, in which the return module is configured to generate a return signal in response to an executing result of the executing module.

10. The auxiliary circuit as claimed in claim 8, wherein the accessing command meets a standard of Serial Advanced Technology Attachment, SATA.

11. The auxiliary circuit as claimed in claim 8, wherein the accessing command is selected from: a read direct memory access (DMA) command, a read DMA extension (EXT) command, a write DMA command, a write DMA EXT command, a read MULTIPLE command, a read MULTIPLE EXT command, a WRITE MULTIPLE command, a WRITE MULTIPLE EXT command, a read SECTORS command, a read SECTORS EXT command, a WRITE SECTORS command, a WRITE SECTORS EXT command, a read first party direct memory access (FPDMA) QUEUE command, a read FPDMA QUEUE EXT command, and a combination thereof.

12. The auxiliary circuit as claimed in claim 8, wherein the pre-determined accessing mode is selected from: a DMA data in mode, a DMA data out mode, a PIO data in mode, a programmed input/output (PIO) data out mode, a FPDMA queue mode, a read DMA queue mode, a write DMA queue, and a combination thereof.

13. The auxiliary circuit as claimed in claim 8, the executing module is further configured to execute the pre-determined accessing mode to read or write the non-volatile memory in response to a wear-leveling command signal of the memory controller.

* * * * *